(12) United States Patent
Jepsen et al.

(10) Patent No.: US 6,172,792 B1
(45) Date of Patent: *Jan. 9, 2001

(54) METHOD AND APPARATUS FOR FORMING OPTICAL GRATINGS

(76) Inventors: Mary Lou Jepsen, 917 Sanchez St., San Francisco, CA (US) 94806; Phillip Alvelda, 6700 Pinehaven, Oakland, CA (US) 94611

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/016,164

(22) Filed: Jan. 30, 1998

Related U.S. Application Data

(60) Provisional application No. 60/036,477, filed on Jan. 31, 1997.

(51) Int. Cl.[7] .............................. G02F 1/03; G02F 1/1343; G02B 5/18
(52) U.S. Cl. ..................... 359/254; 359/256; 359/571; 359/573; 359/575; 349/142; 349/143; 349/156; 349/201; 349/202
(58) Field of Search ...................................... 359/558, 566, 359/568, 569, 571, 572, 573, 575, 576, 318, 251–253, 254, 256, 259, 296, 316–319, 322, 323; 349/201, 202, 139, 142, 143, 156

(56) References Cited

U.S. PATENT DOCUMENTS

| | | | | |
|---|---|---|---|---|
| 3,653,742 | * | 4/1972 | Buchan | 359/254 |
| 3,901,584 | * | 8/1975 | Yamazaki | 359/254 |
| 3,924,932 | * | 12/1975 | Yamamoto | 359/254 |
| 3,940,201 | * | 2/1976 | Micheron et al. | 359/254 |
| 4,389,096 | * | 6/1983 | Hori et al. | 359/571 |
| 4,850,681 | * | 7/1989 | Yamanobe et al. | 349/201 |
| 4,887,104 | * | 12/1989 | Kitano et al. | 359/254 |
| 4,993,811 | * | 2/1991 | Blazey et al. | 359/254 |
| 5,212,583 | * | 5/1993 | Vali et al. | 359/254 |
| 5,319,492 | * | 6/1994 | Dorn et al. | 359/296 |
| 5,581,642 | * | 12/1996 | Deacon et al. | 359/573 |
| 5,943,159 | * | 8/1999 | Zhu | 359/254 |
| 6,057,955 | * | 5/2000 | Yamamoto | 359/254 |
| 6,075,582 | * | 6/2000 | Onnagawa et al. | 349/139 |

FOREIGN PATENT DOCUMENTS

| | | | |
|---|---|---|---|
| 5-188343 | * | 7/1993 | (JP) . |
| 5-210012 | * | 8/1993 | (JP) . |
| 6-245027 | * | 9/1994 | (JP) . |
| 6-250153 | * | 9/1994 | (JP) . |
| 6-308471 | * | 11/1994 | (JP) . |
| 8-076077 | * | 3/1996 | (JP) . |
| 9-281330 | * | 10/1997 | (JP) . |
| 10-90708 | * | 4/1998 | (JP) . |

* cited by examiner

*Primary Examiner*—Georgia Epps
*Assistant Examiner*—Evelyn A. Lester
(74) *Attorney, Agent, or Firm*—Townsend and Townsend and Crew LLP

(57) ABSTRACT

An apparatus for redirecting physical energy includes a substrate defining a first boundary of a region, a first electrode defining a second boundary of the region, the second boundary disposed opposite to the first boundary, a second electrode adjacent to the first boundary for cooperating with the first electrode to apply a non-uniform electric field to the region, the non-uniform electric field having electrical field intensities simultaneously including a first electric field intensity and a second electric field intensity, and a layer of material disposed in the region, the layer having a variable index of refraction responsive to the electric field intensities of the non-uniform electric field, the variable index of refraction including a first index of refraction in response to the first electric field intensity and a second index of refraction in response to the second electric field intensity.

35 Claims, 11 Drawing Sheets

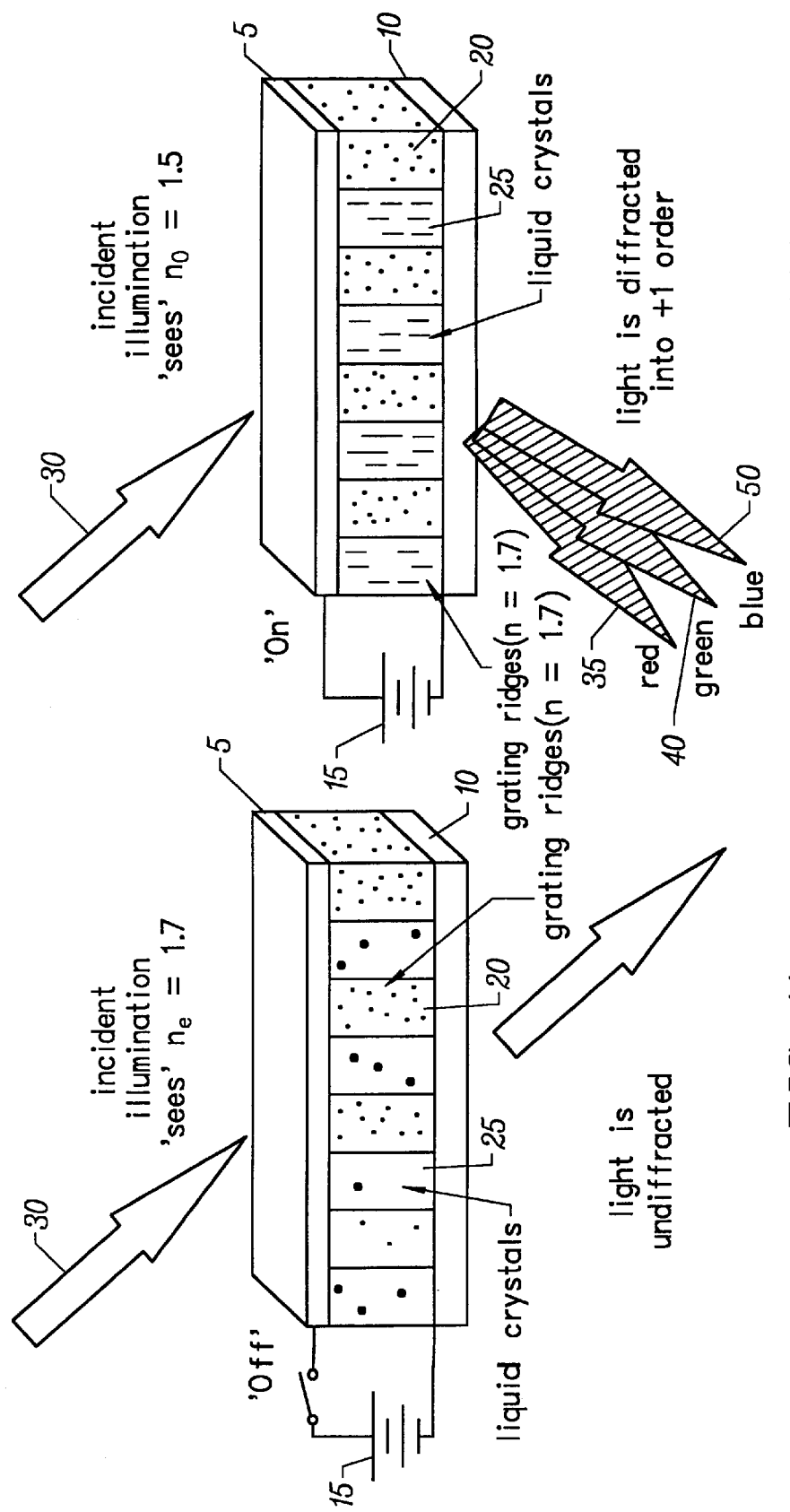

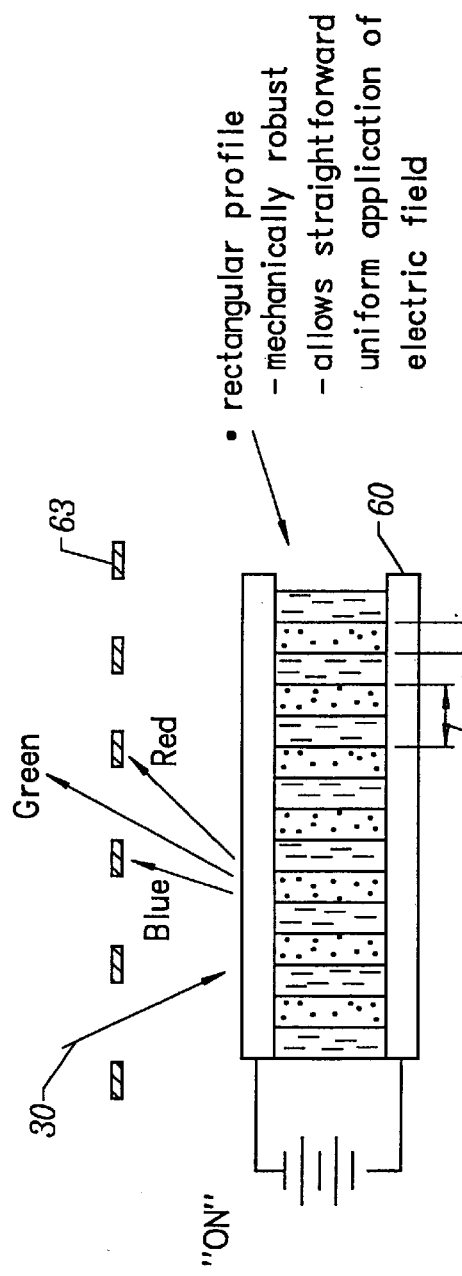
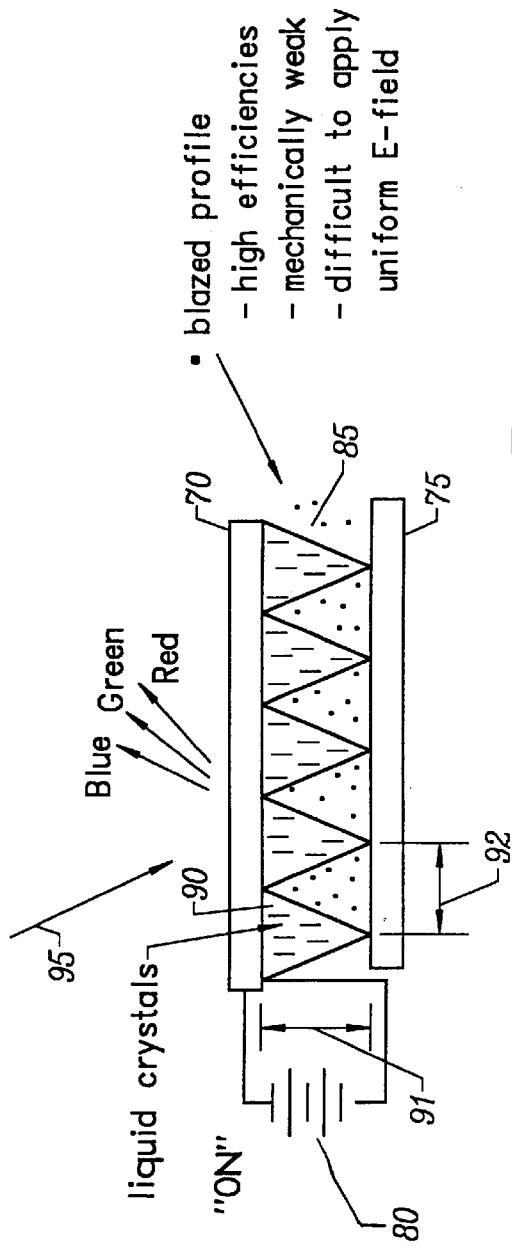

METHOD AND APPARATUS FOR FORMING OPTICAL GRATINGS

This application claims the benefit of U.S. Provisional Application No. 60/036,477, filed Jan. 31, 1997, the disclosure of which is incorporated by reference.

BACKGROUND OF THE INVENTION

The present invention relates to methods and apparatus for redirecting physical energy, in particular, improved methods and apparatus for forming optical gratings for color displays.

More specifically, the present invention relates to a light diffracting device with several gratings, each with a different pitch, that is suitable for optical display, light coupling, optical recording, light communications, spectral analysis, among others. More particularly, the device can be simply fabricated on standard micro-electronic foundry lines and allows integration between the diffractive structure and circuitry embedded in the semiconductor wafer, while still achieving high diffraction efficiencies (>90%). The diffraction efficiency of the device can also be optionally modulated by an applied field provided by semiconductor circuitry embedded in the substrate.

I. Rectangular Gratings

FIGS. 1a and 1b illustrate a typical transmissive mode grating. FIGS. 1a and 1b include transparent electrodes 5 and 10 coupled to a voltage source 15, grating ridges 20, and liquid crystals 25 between the grating ridges. FIG. 1a also includes incident illumination (incident light) 30.

As is well known, liquid crystals 25 typically are characterized two indices of refraction, $n_o$, ordinary mode, and $n_e$, extraordinary mode. In this example, grating ridges 20 have an index of refraction equal to $n_e$.

In FIG. 1a, when voltage source 15 is not applied to transparent electrodes 5 and 10, "off", liquid crystal 25 and grating ridges 20 have the same index of refraction, $n_e$. As a result, as illustrated, incident illumination 30 is not diffracted.

In FIG. 1b, when voltage source 15 is applied to transparent electrodes 5 and 10, "on", liquid crystals 25 have an index of refraction equal to $n_o$. As a result, as illustrated, incident illumination 30 is diffracted according to wavelength of light, as is well known in the art. Three important color wavelengths, red 35, green 40, and blue 45 are shown for convenience.

FIG. 1c illustrates a typical reflective mode grating. FIG. 1c includes a bottom electrode 60, and a masking layer 63.

In contrast to the transmissive mode grating, the bottom electrode 60 is typically manufactured from reflective material.

The grating structure such as that illustrated FIG. 1c, includes parameters such as the width 65 of the grating ridges, the length 70 of one grating period, and duty cycle (width 65 divided by length 70). Such parameters are user controlled and determine the performance of the grating.

In FIG. 1c, masking layer 63 is typically provided to mask undesired colors from being refracted from the device. In this example, primarily green colored light is refracted whereas blue and red colored light is inhibited. The parameters of masking layer 63 are user controlled in conjunction with the grating parameters to control the color of light desired. Masking layer 63 can also be used in conjunction with a diffractive mode device for the same purpose.

With lower spatial frequencies grating structures, light is split between the diffracted orders which survive. Thus, the diffraction efficiency in each single order is reduced.

II. Blazed Gratings

FIG. 2 illustrates a reflective mode blazed grating. FIG. 2 includes electrodes 70 and 75 coupled to a voltage source 80, blazed grating ridges 85, and liquid crystals 90 between the grating ridges. FIG. 2 also includes incident illumination (incident light) 95.

In a transmissive mode grating, typically bottom electrode 75 is typically manufactured from transparent material.

With blazed gratings as illustrated in FIG. 2, parameters such as the height 91 of the blazed grating ridges and the length 92 of one grating period are typical indicators of grating performance. One well known benefit of blazed gratings versus rectangular gratings is that it is more efficient in producing light of selected colors relative to the intensity of the incident illumination for courser frequency gratings. Typically, efficiencies are on the order of 90% of the intensity of the incident illumination.

One drawback with current rectangular grating structure is that for producing an efficient structure, length 92 must be on the order of the wavelength of light of interest. For blazed gratings, courser spatial frequencies are typically used. Current manufacturing techniques for gratings include engraving a substrate with a diamond cutting edge, or embossing a substrate. Further, typical blazed gratings structures formed by current methods are very difficult to fabricate, and are mechanically fragile. Also, it is difficult to apply a uniform electric field to the blazed structure.

III. Related Art

High diffraction efficiency, in a single, non-$0^{th}$, diffractive order, is desirable for most applications of diffraction gratings. Fabrication of highly efficient (>90%) diffractive structures is difficult, time consuming and expensive. Holographic fabrication can yield high diffraction efficiencies, but when the gratings of different pitches are required on the same substrate several problems arise. 1) It is difficult to mask off small areas from exposure; 2) It is difficult to balance the diffraction efficiencies of the different gratings to the specified or desired values; and 3) The process is time consuming, and thus expensive in a manufacturing setting.

E. Schulze and W. von Reden, "Diffractive liquid crystal spatial light modulators with optically integrated fine-pitch phase gratings", SPIE, Vol. 2408, pp. 113–119, 1995 and U.S. Pat. Nos. 5,198,912 and 4,970,129 illustrate holographic exposures for polymer dispersed liquid crystal films. A drawback with this approach is that a great deal of light is scattered by these grating devices when no electrical field is applied. Further, the operating voltages of this device are still very high (>100 volts) and thus silicon driving circuitry is not easy to integrate.

Embossed gratings have often been used for inexpensive diffractive structures or refractive structures. One drawback with this approach is that such embossed structures cannot generally be used for both alignment purposes and electrical contact purposes with the substrate circuitry. Further, the physical pressure required for the embossing process often causes brittle semiconductor materials to shatter.

High diffraction efficiencies for visible light with standard fabrication techniques (which produce rectangular grooves) have not been achieved. For example, for visible light, the grating period desired implies 0.25 micron feature sizes, which, at this writing, still imposes very high costs. Diffraction of ultraviolet light with high efficiency, requires even finer-pitch diffractive structures. Such fine periods allow only two diffractive orders ($0^{th}$ and +1) to survive and thus the light is split between only two possible diffractive orders, thus high diffraction efficiency can be achieved in a single diffractive order as all other diffractive orders in such fine-pitch diffractive structures are extinguished. Further, courser-period rectangular-profile gratings allow several diffractive structures to survive, but the light which is diffracted is split between these diffractive orders, thus lowering the diffraction efficiency attained in any single one diffractive order.

U.S. Pat. Nos. 5,161,059, 4,895,790, 4,846,552, and 5,218,471 discuss methods for fabricated multi-level diffractive structures using micro-electronic techniques and equipment. The methods outlined in these patents generally, however, require 4 photolithographic masks and multiple steps to achieve a fabricated 16 level diffractive structure. Thus, these methods are quite expensive and time consuming.

Thus what is required are improved methods for forming blazed grating structures and Bragg grating structures.

SUMMARY OF THE INVENTION

It is an object of the present invention to provide new methods for creating and modulating highly efficient diffraction gratings which can easily be integrated with semiconductor devices, directly on the wafer (or chip) itself.

It is another object of the present invention to provide a light modulation device which has a high contrast ratio, fast response time, low-voltage operation, high light flux utilization efficiency, and stable function.

It is another object of the present invention to provide a fabrication method that reduces mask alignment requirements and reduces the etching of multi-level or non-rectangular profile diffraction gratings.

In order to achieve the above-effects, a non-uniform electric field is applied to the material filling the rectangularly shaped grooves of the grating structure. The material responds to the non-uniform field in such a way as to simulate a sawtooth, blazed, or sinusoidal diffractive structure, thus attaining high diffraction efficiencies in a single diffractive order with straight-forward microfabrication techniques. Materials that can be used to achieve this effect include, but are not limited to, liquid crystals, PLZT, ADP, KDP, $LiNBO_3$, etc.

According to one embodiment of the present invention, an apparatus for redirecting physical energy includes a substrate defining a first boundary of a region, a first electrode defining a second boundary of the region, the second boundary disposed opposite to the first boundary, and a second electrode adjacent to the first boundary for cooperating with the first electrode to apply a non-uniform electric field to the region, the non-uniform electric field having electrical field intensities simultaneously including a first electric field intensity and a second electric field intensity. Further, a layer of material disposed in the region, the layer having a variable index of refraction responsive to the electric field intensities of the non-uniform electric field, the variable index of refraction including a first index of refraction in response to the first electric field intensity and a second index of refraction in response to the second electric field intensity.

According to another embodiment of the present invention a method for forming an apparatus for redirecting physical energy includes the steps of providing a substrate having a portion defining a first boundary of a region, positioning a first electrode opposite to the first boundary, the first electrode defining a second boundary of the region, and positioning a second electrode adjacent to the first boundary. The method also includes the step of applying a non-uniform electric field between the first electrode and the second electrode within the region, the non-uniform electric field having electric field intensities simultaneously including a first electric field intensity and a second electric field intensity. The method further includes disposing a layer of material in the region, the layer of material having a variable index of refraction responsive to the electric field intensities of the non-uniform electric field, the variable index of refraction including a first index of refraction in response to the first electric field intensity and a second index of refraction in response to the second electric field intensity.

Further understanding of the nature and advantages of the invention may be realized by reference to the remaining portions of the specification and drawings.

BRIEF DESCRIPTION OF THE DRAWINGS

FIGS. 1a and 1b illustrate a typical transmissive mode grating;

FIG. 1c illustrates a typical reflective mode grating;

FIG. 2 illustrates a reflective mode blazed grating;

FIGS. 3b and 3c illustrate a typical operation of the embodiment illustrated in FIG. 3a;

DESCRIPTION OF SPECIFIC EMBODIMENTS

I. Virtual Blaze Gratings

A. Sidewall Configurations

1. Off-Center Configurations

Figure 3A:
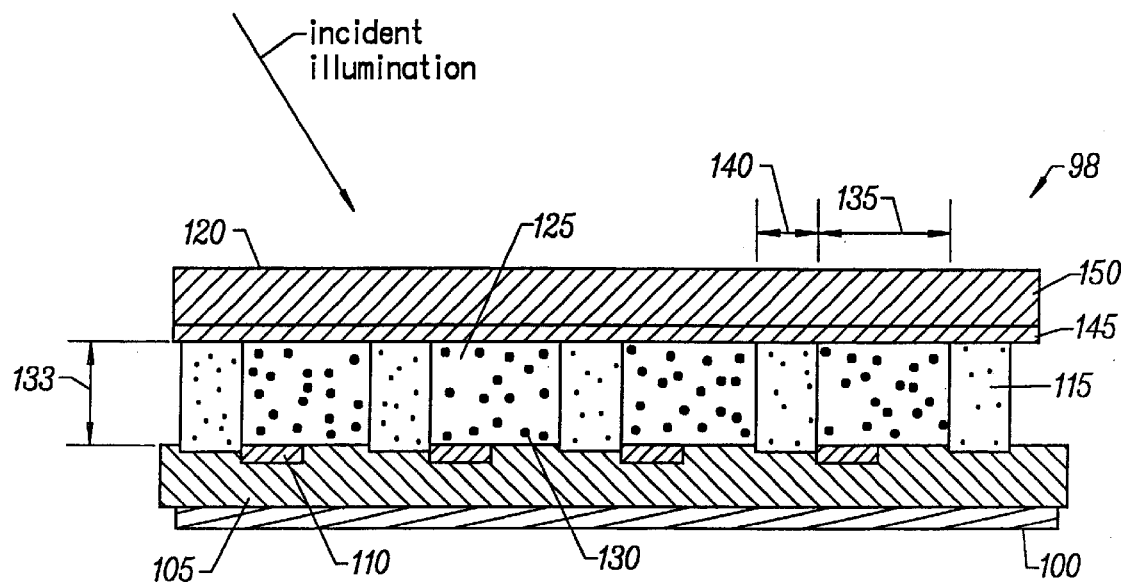
FIG. 3a illustrates a cross-section of a structure used in an embodiment of the present invention.

FIG. 3a illustrates a cross-section of a structure used in an embodiment of the present invention. FIG. 3a includes a structure 98 including substrate 100, an insulating layer 105, electrodes 110, insulating walls 115, a conductive layer 120, and cavities 125, defining cell regions, bounded by at least the above materials. Cavities 125 include material 130, and conductive layer 120 includes a conductive material 145 disposed on transparent substrate 150.

Substrate 100 is typically used when operating the invention in a reflective mode, i.e. where incident light does not pass through structure 98. In a transmissive mode, i.e. where incident light passes through structure 98, substrate 100 may be eliminated. Substrate 100 typically comprises a semiconductor substrate such as silicon, although other semiconductor substrates and other substrate materials are within alternative embodiments of the present invention.

Insulating layer 105 typically comprise silicon dioxide, although silicon nitride, and other materials may also be used instead or in combination. Any conventional deposition method can be used to deposit insulating layer 105 upon substrate 100, for example, chemical vapor deposition (CVD) or plasma enhanced chemical vapor deposition (PECVD), and the like. Alternatively, any conventional oxidation method can be used to grow insulating layer 105 from substrate 100, for example, a wet or dry oxidation of a silicon substrate.

Disposed adjacent to insulting layer 105 are electrodes 110. Each of the electrodes 110 are typically electrically coupled to control electronics, which selectively applies voltages to electrodes 110. Such electronics are well known to one of ordinary skill in the art, such as a voltage source.

Electrodes 110 typically comprise aluminum although other types of metallic or conductive material, such as polysilicon, or indium tin oxide (ITO), or combinations of materials, may be used. In the case of a reflective device, typically metallic aluminum is preferred. In the case of a transmissive device, typically ITO is preferred. These layers may be deposited and patterned upon insulating layer 105 using any conventional method.

FIG. 3a illustrates electrodes 110 disposed within insulating layer 105. Alternatively, electrodes 110 may be disposed on top of insulating layer 105. Other methods and configuration for forming electrodes 110 adjacent to insulating layer may also be used in the present invention. As illustrated in FIG. 3a, in the present embodiment, electrodes 110 are placed off-center relative to the centers of respective cavities 125. The reason for this will be explained below.

Insulating walls 115 (sidewall spacers or spacers) typically comprise a material that inhibits penetration of electric fields. Preferably, insulating walls 115 and insulating layer 105 comprise the same materials.

Insulating walls 115 and insulating layer 105 may be formed within the same processing step. For example, a thick insulating layer may first be formed by deposition onto substrate 100, for example with a PECVD, or by oxidation of substrate 100, for example a wet oxidation of silicon. Next, for example, using conventional photolithography and etching techniques, cavities 125 are then defined and bound by walls, or side walls, of the thick insulating layer. The side walls are also termed terminus regions of cavity 125 or of cell regions. Subsequently electrodes 110 can then be defined within the formed cavities 125.

Alternatively, insulating walls 115 and insulating layer 105 may be formed in separate process steps and of different materials. For example, insulating layer 105 and electrodes 110 may first be formed as described above. Next, a layer of insulating material can be formed over insulating layer 105 and electrodes 110. Subsequently, using conventional photolithography and etching techniques, insulating walls 115 are formed.

In FIG. 3a, insulating walls 115 are shown in cross-section. From above, it should be understood that all of the insulating walls 115 typically are formed from a contiguous layer of material that is patterned with cavities 125. Preferably, insulating walls 115 are typical arraigned in a rectangular configuration thus, cavities 130 are rectangularly shaped. Other arrangements and shapes for insulating walls 115 and cavities 130 are contemplated in alternative embodiments of the present invention.

Typically, insulating walls 115 have a distance 133 of approximately 0.1 microns to 2.0 microns above insulating layer 105, although other dimensions are contemplated within alternative embodiments. The distance 135 between insulating walls 115, the width 140 of insulating walls 115, and the duty cycle, enable the user to approximately determine the qualitative diffraction or refraction of incident light.

In FIG. 3a, an exemplary spacing for diffracting incident light to obtain a high efficiency blazed grating, for blue light, insulating walls 115 are approximately 1.2 microns wide, cavities 125 are approximately 0.8 microns wide, and the duty cycle is approximately 42.9%. In another exemplary spacing to obtain a high efficiency blazed grating for green light, insulating walls 115 are approximately 1.3 microns wide, cavities 125 are approximately 0.9 microns wide, and the duty cycle is approximately 46.5%. In another exemplary spacing to obtain a high efficiency blazed grating for red light, insulating walls 115 are approximately 1.4 microns wide, cavities 125 are approximately 1.0 microns wide, and the duty cycle is approximately 44.1%.

In a preferred embodiment of the present invention, structure 98 includes three different grid spacings and duty cycles, as illustrated by the examples above, to facilitate the production of different wavelengths of light. A masking structure, as illustrated in FIG. 1c, used in combination with this structure, further enhances the production of colored light.

Material 130 is typically next disposed within cavities 125. Material 130 typically comprises a material that is characterized as having a variable index of refraction responsive to an applied electric field. Typically material 130 has two major indices of refraction: a parallel index ($n_o$ ordinary index) $n_\|$, and a perpendicular index ($n_e$ extraordinary index) $n_\perp$. In FIG. 3a, material 130 is illustrated along the parallel index with respect to the page and along the perpendicular index with respect to incident illumination.

What is preferred for material 130 is a material having a large birefringence value $\Delta n$ ($\Delta n = n_\| - n_\perp$). The index of refraction at any point within cavities 125 thus preferably varies from $n_\|$ to $n_\perp$. Such materials are well known in the display industry and include liquid crystals, PLZT, ADP, KDP, LiNBO$_3$, and the like. An exemplary material used for material 130 is a liquid crystal MLC1843 from E.M. Industries having $n_\|$, of 1.5, a $n_\perp$ of 1.7, and a $\Delta n$ of 0.2.

Material 130 may be deposited in cavities 125 in any conventional method such as vacuum wick deposition, and the like. Merely, for sake of convenience, at this stage, structure 95 will be termed "half-completed".

Conductive layer 120 is disposed on top of insulting layer 115 and material 130, and defines a boundary for cavities 125. Typically, conductive layer 120 is also electrically coupled to the control electronics which selectively applies voltages across individual electrodes 110 and conductive layer 120. Typically, conductive layer 120 is configured as an electrical ground.

Preferably, conductive layer 120 comprises conductive material 145 disposed on transparent substrate 150. Conductive material 145 typically comprises a transparent electrical conductor such as indium tin oxide (ITO), although other transparent conductors 145 may also be used. Transparent substrate 150 typically comprises glass, thus whether in diffractive mode or refractive mode, incident light upon structure 98 is transmitted to the underlying layers.

Conductive layer 120 is typically formed by depositing a layer of conductive material 145 onto transparent substrate 150 in a conventional manner. Next conductive layer 120 is disposed conductive material 145 side-down, upon the "half-completed structure". Alternatively, conductive material 145 may first be pattered on transparent substrate 150 by any conventional method, before placing it upon the half-completed structure. The former case is typically preferred, in order to avoid extra photolithographic and etching steps for conductive layer 120.

As illustrated in FIG. 3a, typically conductive layer 120 spans the entire width of cavities 125, whereas electrodes 110 do not span the entire width of cavities 125. Further, as described above, typically electrodes 110 are disposed off-center with respect to cavities 125 and importantly, with respect to conductive layer 120 within cavities 125.

Along the depth (into the page), conductive layer 120 and electrodes 110 preferably maintain the same configuration in relation to cavities 125. In other embodiments of the present invention, the relation of conductive layer 120 to electrodes 110 may vary with depth (into the page).

In an alternative embodiment of the embodiment described above, the arraignments of the conductive layer 120 and electrodes 110 may be reversed. Thus a conductive layer can span the surface of insulating substrate 105, and electrodes can be patterned upon transparent substrate 150. The embodiments illustrated herein are thus not limiting.

Figure 3B:
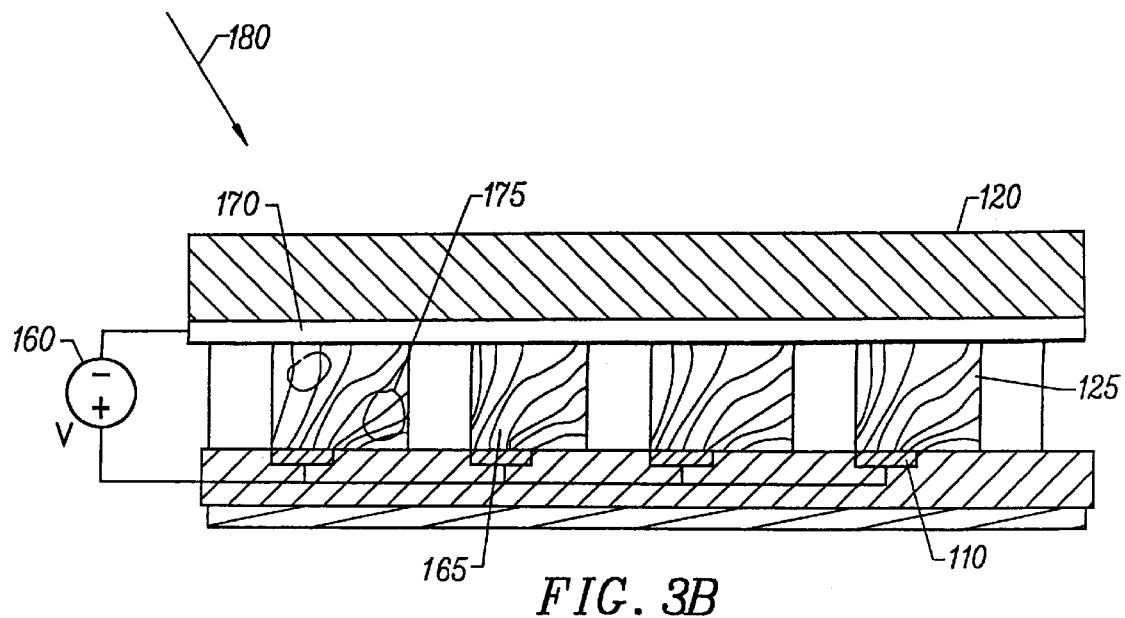
Figure 3C:
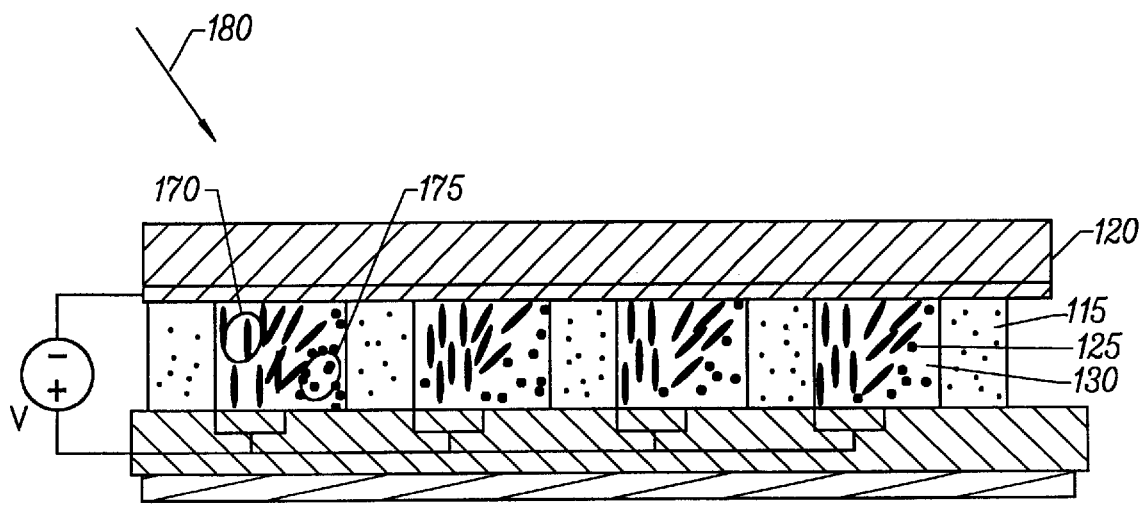

FIGS. 3b and 3c illustrate a typical operation of the embodiment illustrated in FIG. 3a. FIG. 3b illustrates the structure disclosed in FIG. 3a with a voltage source 160 and field lines 165. Field lines 165 include region 170 and region 175.

In FIG. 3b, voltage source 160 is applied across electrodes 110 and conductive layer 120. Voltage source 160 may be any conventional voltage source, for example a voltage source used to drive memory elements or LCD displays cells. Further, the polarity of voltage source 160 may be as illustrated or reversed, or may vary with time.

In response to a voltage from voltage source 160, electric fields are formed and are illustrated as field lines 165. As can be seen in FIG. 3b, the electric field is positionally dependent within cavities 125. In general, where electrodes 110 and conductive layer 120 are closer, the electric field will be stronger, region 170, and where electrodes 110 and conductive layer 120 are further apart, the electric field will be weaker, region 175.

In response to the positionally dependent electric field, the index of refraction of material 130 is positionally changed within cavities 125. In the example in FIG. 3c, within region 175, the electric field is weaker, thus the index of refraction remains relatively unchanged at $n_\parallel$, relative to the page. However, within region 170, the electric field is stronger, thus the index of refraction changes to approximately $n_\perp$ relative to the page. Between regions 170 and 175, the index of refraction predictably varies between $n_\parallel$ and $n_\perp$. Relative to incident light 180, the index of refraction within region 170 is approximately $n_\parallel$, and the index of refraction within region 175 is approximately $n_\perp$.

Figure 4:
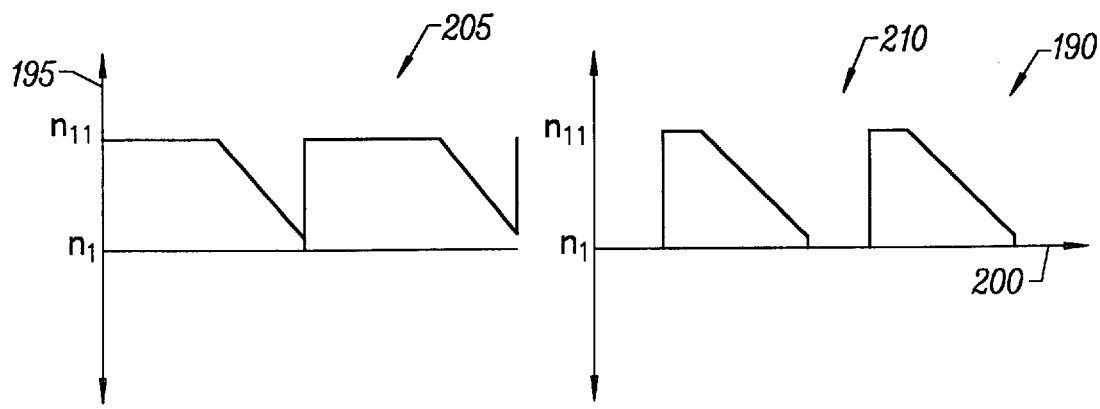
FIG. 4 illustrates virtual grating structures formed according to the embodiment illustrated in FIG. 3c.

FIG. 4 illustrates virtual grating structures formed according to the embodiment illustrated in FIG. 3c. FIG. 4 includes a plot 190 of refractive index 195 versus position 200 relative to incident light 180. Plot 190 includes a region 205 and a region 210 representing two different embodiments.

In region 205, insulating walls 115 are formed such that its index of refraction matches the parallel index of refraction $n_\parallel$. In this embodiment, it can be seen that the index of refraction within cavities 125 vary from $n_\parallel$ to $n_\perp$ from left to right, in response to the positionally dependent electric field.

In region 210, insulating walls 115 are formed such that its index of refraction matches the perpendicular index of refraction $n_\perp$. In this embodiment, it can also be seen that the index of refraction within cavities 125 vary from $n_\parallel$ to $n_\perp$ from left to right, in response to the positionally dependent electric field.

When no electric field is applied to the embodiment illustrated by region 205, a rectangular grating appears. When no electric field is applied to the embodiment illustrated by region 210, no grating appears.

In the preferred embodiment of the present invention, it is preferred that insulating walls approximately match $n_\perp$ so that no diffraction grating appears to incident light 180 when voltages are not applied to the structure. Other indices of refraction can be used for insulating sidewalls 115 and are contemplated in alternative embodiments of the present invention.

2. Centered Configurations

Figure 5:
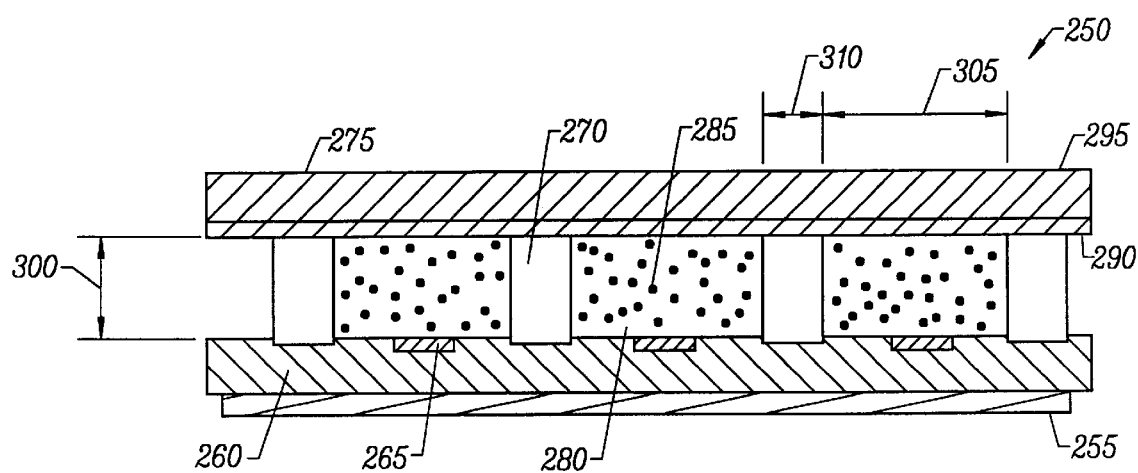
FIG. 5 illustrates a cross section of a structure used in an embodiment of the present invention.

FIG. 5 illustrates a cross-section of a structure used in an embodiment of the present invention. FIG. 5 includes a structure 250 including substrate 255, an insulating layer 260, electrodes 265, insulating walls 270, a conductive layer 275, and cavities 280 formed by the above materials. Cavities 280 include material 285, and conductive layer 275 includes a conductive material 290 disposed on transparent substrate 295.

In FIG. 5, many of the elements and structures are similar to those described in conjunction with FIG. 3a. Thus in this embodiment, many of the same materials, configurations, and fabrication processes can be used, as described above.

In FIG. 5, electrodes 265 are typically shorter in horizontal length relative to conductive layer 275 within cavities 280. Further, electrodes 265 are placed approximately on-center relative to the centers of respective cavities 280 and to conductive layer 275. The reason for this configuration will be explained below.

In this embodiment, typically, insulating walls 270 have a depth 300 of approximately 0.1 microns to 2.0 microns above insulating layer 260, although other dimensions are within alternative embodiments.

The width 305 between insulating walls 270 and the width 310 of insulating walls 115, enable approximate determination of the amount of diffraction of incident light, as described in FIG. 1c.

In FIG. 5, an exemplary spacing for diffracting incident light to obtain high diffraction efficiency blue light, insulating walls 270 are approximately 1.2 microns wide, cavities 280 are approximately 2.4 microns wide, and the duty cycle is approximately 50%. In another exemplary spacing to obtain high diffraction efficiency green light, insulating walls 270 are approximately 1.3 microns wide, cavities 280 are approximately 2.5 microns wide, and the duty cycle is approximately 50%. In another exemplary spacing to obtain high diffraction efficiency red light, insulating walls 270 are approximately 1.4 microns wide, cavities 280 are approximately 2.6 microns wide, and the duty cycle is approximately 50%.

In a preferred embodiment of the present invention, structure 250 includes three different grid spacings and duty cycles, as illustrated by the examples above, to facilitate the production of different wavelengths of light. A masking structure, as illustrated in FIG. 1c, used in combination with this structure, further enhances the production of colored light.

Figure 6A:
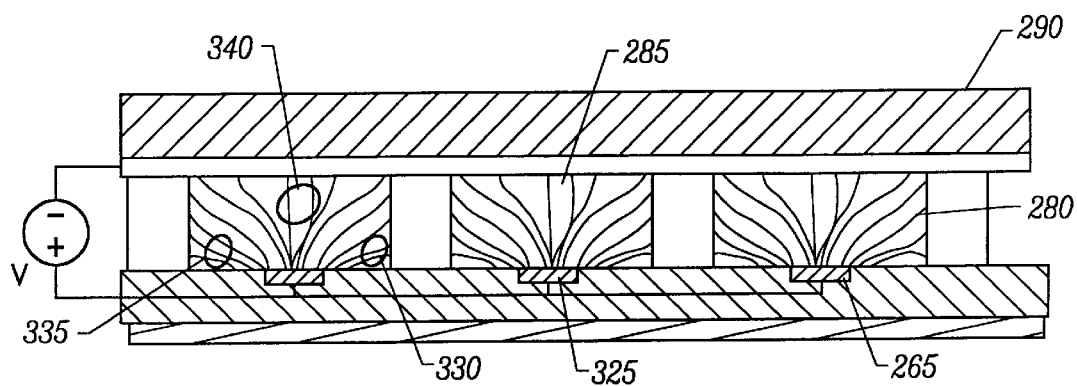
FIGS. 6a and 6b illustrate a typical operation of the embodiment illustrated in FIG. 5.
Figure 6B:
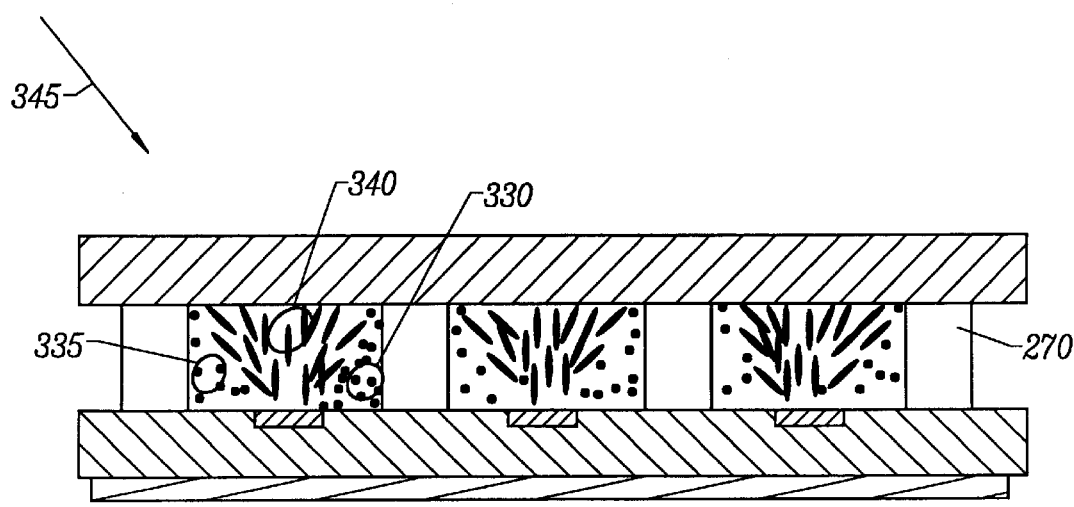

FIGS. 6a and 6b illustrate a typical operation of the embodiment illustrated in FIG. 5. FIG. 6a illustrates the structure disclosed in FIG. 5 with a voltage source 320 and field lines 325. Field lines 325 include regions 330 and 340 and region 345.

In FIG. 6a, voltage source 320 is applied across electrodes 265 and conductive layer 290. Voltage source 265 may be any conventional voltage source as described in conjunction with FIG. 3c.

In response to a voltage from voltage source 265, electric fields are formed and are illustrated as field lines 325. As is illustrated, the electric field is positionally dependent within cavities 280. In general, where electrodes 265 and conductive layer 290 are closer, the electric field will be stronger, region 340 and where electrodes 265 and conductive layer 290 are further apart, the electric field will be weaker, regions 330 and 335.

Similar to the embodiment described above, in response to the positionally dependent electric field, the index of refraction of material 285 is positionally changed within cavities 280. In the example in FIG. 6b, within regions 330 and 335, the electric field is weaker, thus the index of refraction remains relatively unchanged at $n_\perp$ relative to incident light 345. Further, within region 340, the electric field is stronger, thus the index of refraction is changed to approximately $n_\parallel$.

Figure 7:
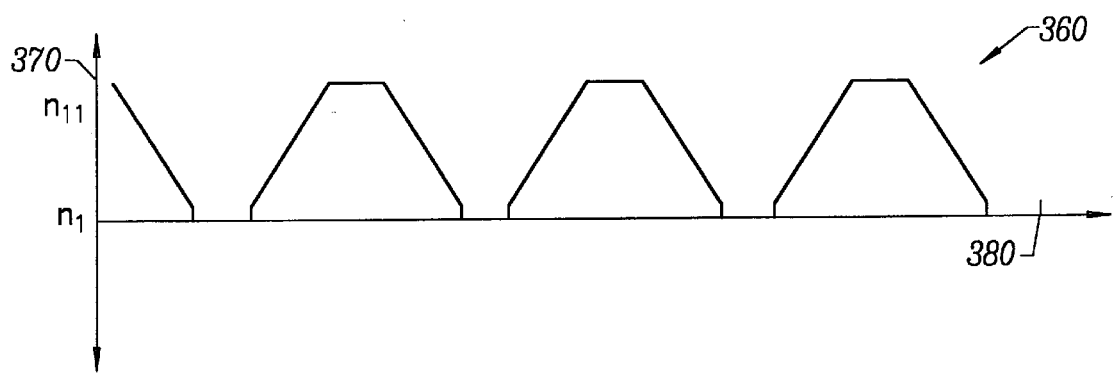
FIG. 7 illustrates virtual grating structures formed according to the embodiment illustrated in FIG. 6b.

FIG. 7 illustrates virtual grating structures formed according to the embodiment illustrated in FIG. 6b. FIG. 7 includes a plot 360 of refractive index 370 versus position 380 relative to incident light 345. In this embodiment, it can be seen that the index of refraction within cavities 280 varies from approximately $n_\perp$ to $n_\parallel$ to $n_\perp$, in response to the positionally dependent electric field.

In the illustrated embodiment, insulating walls 270 are formed such that the index of refraction matches the perpendicular index of refraction $n_\perp$. When no electric field is applied, the index of refraction remains approximately $n_\perp$ thus no virtual grating blaze appears. In other embodiments of the present invention, other indices of refraction can be used for insulating walls 270.

B. Reduced Sidewall Configuration

1. Off-Center Configurations

Figure 8A:
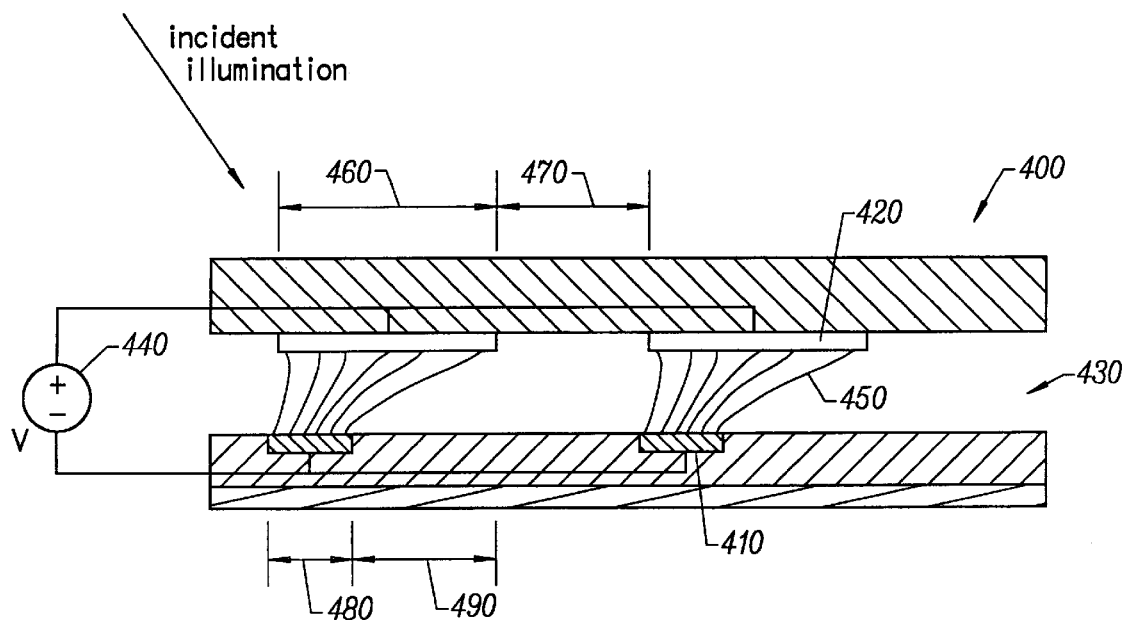
FIG. 8a illustrates typical operation of an alternative embodiment of the present invention.

FIG. 8a illustrates typical operation of an alternative embodiment of the present invention.

FIG. 8a includes a structure 400 having electrodes 410, conducting material 420 and a region 430 typically filled with material having a high birefringence value, as previously described. Within region 430, a voltage source 440 provides electric fields that are represented as field lines 450.

In FIG. 8a the structure 400 resembles the structure illustrated in FIG. 3a. Structure 400 may comprise the same or different materials and be manufactured using the same or different fabrication processes as described in conjunction with FIG. 3a. In contrast to FIG. 3a, the number of insulating walls 115 in FIG. 3a may be completely or partially reduced. Further, conducting material 420 may be patterned (as described in FIG. 3a).

In this embodiment, typically region 430 has a depth of approximately 0.1 microns to 2.0 microns above electrodes 410, although other dimensions are within alternative embodiments.

The sizes 460 of conducting material 420, the distance 470 between adjacent conducting material 420, the sizes 480 of electrodes 410, and the amount of offset 490 between conducting material 420 and electrodes 410, among other factors, determine the amount of diffraction or refraction of incident light, as described in FIG. 1a and FIG. 1b.

In a preferred embodiment of the present invention, structure 400 includes three different grid spacings and duty cycles, as illustrated by the examples above, to facilitate the production of different wavelengths of light. A masking structure, as illustrated in FIG. 1c, used in combination with this structure, further enhances the production of colored light.

In the configuration shown in FIG. 8a, it can be seen that the electric field is positionally dependent within region 430. In general, where the electrodes 410 and conductive layer 420 are closer, the electric field will be stronger, and where electrodes 410 and conductive layer 420 are further apart, the electric field will be weaker.

Similar to the embodiments described above, in response to the positionally dependent electric field, the index of refraction of the material is positionally changed within region 430.

Figure 8B:
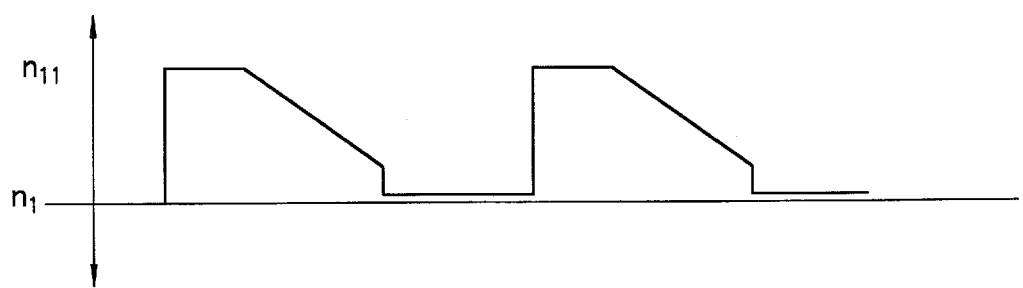
FIG. 8b illustrates a representative virtual grating structure formed according to the embodiment illustrated in FIG. 8a relative to incident illumination.

FIG. 8b illustrates a representative virtual grating structure formed according to the embodiment illustrated in FIG. 8a relative to incident illumination.

2. Centered Configurations

Figure 9A:
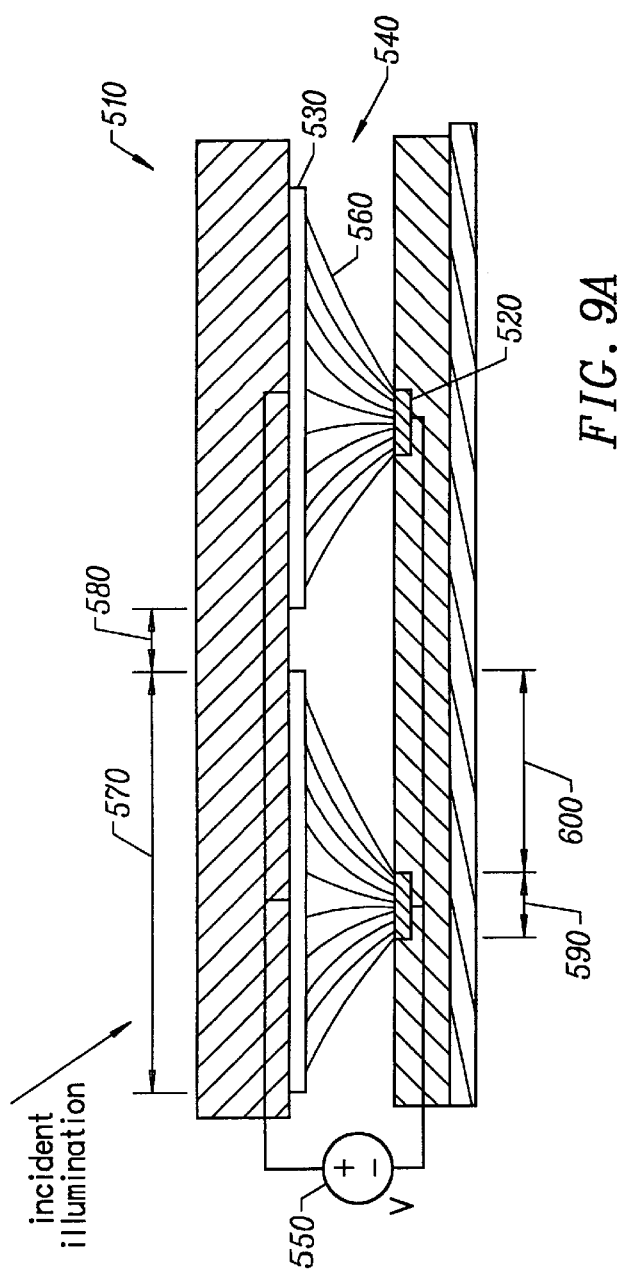
FIG. 9a illustrates typical operation of an alternative embodiment of the present invention.

FIG. 9a illustrates typical operation of an alternative embodiment of the present invention.

FIG. 9a includes a structure 510 having electrodes 520, conducting material 530 and a region 540 typically filled with material having a high birefringence value, as previously described. Within region 540, a voltage source 550 provides electric fields that are represented as field lines 560.

In FIG. 9a the structure 510 resembles the structure illustrated in FIG. 5. Structure 510 may comprise the same or different materials and be manufactured using the same or different fabrication processes as described in conjunction with FIG. 5. In contrast to FIG. 5, the number of insulating walls 270 in FIG. 5 may be completely or partially reduced. Further, conducting material 530 may be patterned.

In this embodiment, typically, region 540 has a depth of approximately 0.1 microns to 2.0 microns above electrodes 520, although other dimensions are within alternative embodiments.

The sizes 570 of conducting material 530, the distance 580 between adjacent conducting material 530, the sizes 590 of electrodes 520, and the amount of offset 600 between conducting material 530 and electrodes 520, among other factors, determine the amount of diffraction or refraction of incident light, as described in FIG. 1a and FIG. 1b.

In a preferred embodiment of the present invention, structure 510 includes three different grid spacings and duty cycles, as illustrated by the examples above, to facilitate the production of different wavelengths of light. A masking structure, as illustrated in FIG. 1c, used in combination with this structure, further enhances the production of colored light.

In the configuration as shown in FIG. 9a, it can be seen that the electric field is positionally dependent within region 540. In general, where the electrodes 520 and conductive layer 530 are closer, the electric field will be stronger, and where electrodes 520 and conductive layer 530 are further apart, the electric field will be weaker.

Similar to the embodiments described above, in response to the positionally dependent electric field, the index of refraction of the material is positionally changed within region 540.

Figure 9B:
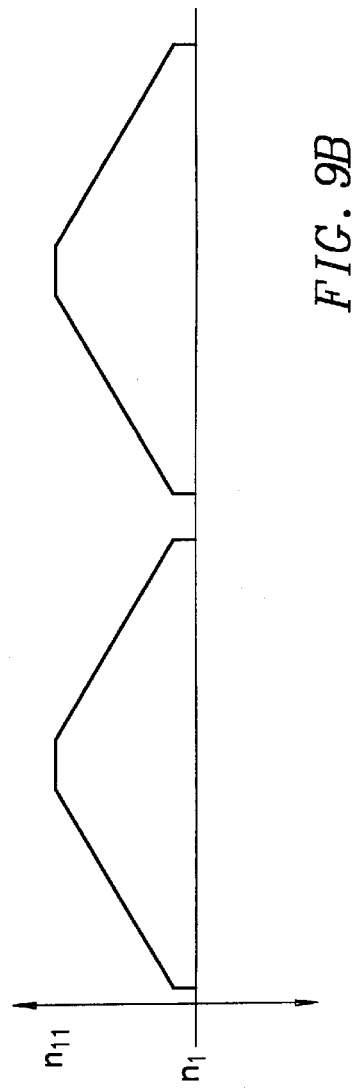
FIG. 9b illustrates a representative virtual grating structure formed according to the embodiment illustrated in FIG. 9a relative to incident illumination.

FIG. 9b illustrates a representative virtual grating structure formed according to the embodiment illustrated in FIG. 9a relative to incident illumination.

C. Planar Switching Configurations

Figure 10A:
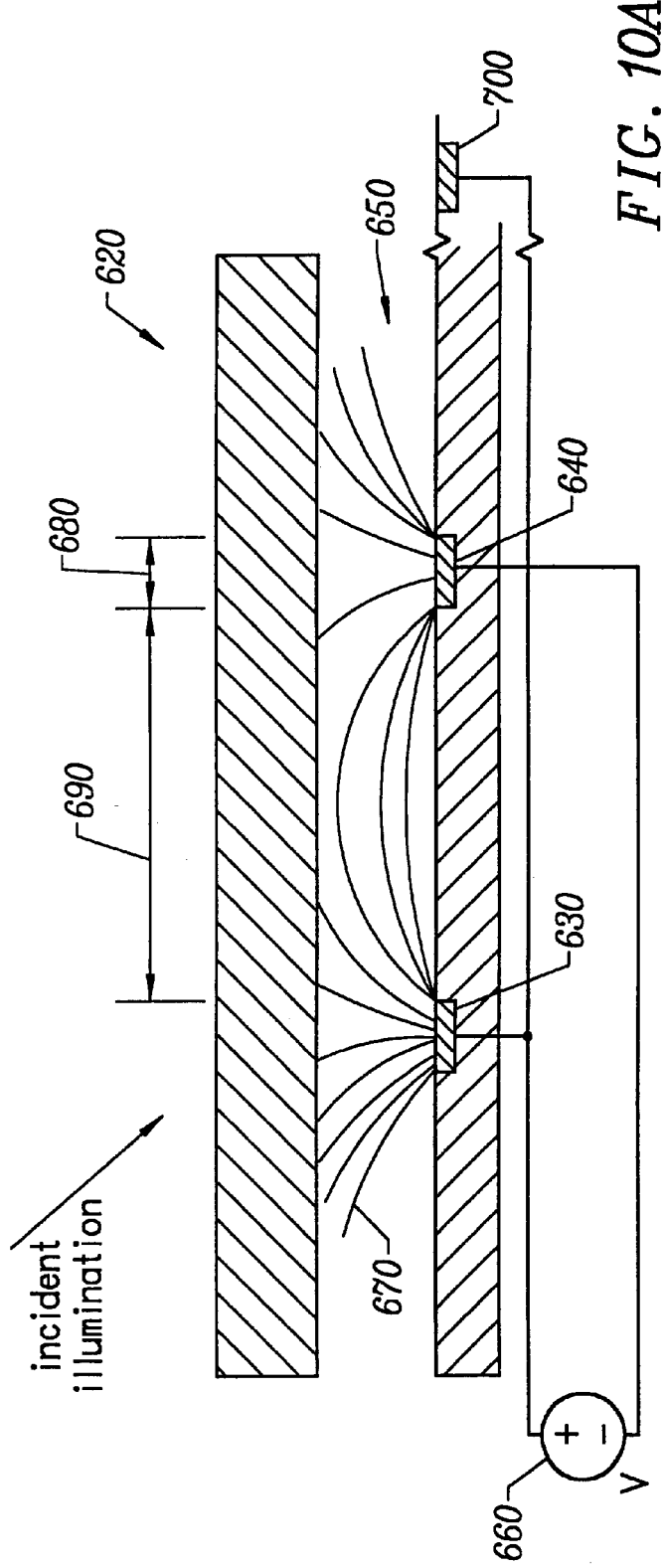
FIG. 10a illustrates typical operation of an alternative embodiment of the present invention.

FIG. 10a illustrates typical operation of an alternative embodiment of the present invention.

FIG. 10a includes a structure 620 having electrodes 630, 640, and 700, a region 650 typically filled with material having a high birefringence value, as previously described. Within region 650, a voltage source 660 provides electric fields that are represented as field lines 670.

In FIG. 10a, structure 620 may comprise the same or different materials and be manufactured using the same or different fabrication processes as described in conjunction with FIG. 3a. In contrast to FIG. 3a, the number of insulating walls 115 in FIG. 3a may be completely or partially reduced. Further, conducting material 145 may be completely or partially removed.

In this embodiment, typically, region 650 has a depth of approximately 0.1 microns to 2.0 microns above electrodes 630, 640, and 700, although other dimensions are within alternative embodiments.

The sizes 680 of electrodes 630, 640, and 700 and the distance 690 between electrodes 630, 640, and 700, among other factors, determine the amount of diffraction or refraction of incident light, as described in FIG. 1a and FIG. 1b.

In a preferred embodiment of the present invention, structure 620 includes three different grid spacings and duty cycles, as illustrated by the examples above, to facilitate the production of different wavelengths of light. A masking structure, as illustrated in FIG. 1c, used in combination with this structure, further enhances the production of colored light.

In the configuration as shown in FIG. 10a, it can be seen that the electric field is positionally dependent within region 650. In general, the electric field will be stronger between the electrodes 630, 640, and 700.

Similar to the embodiments described above, in response to the positionally dependent electric field, the index of refraction of the material is positionally changed within region 650.

In the preferred embodiment of the present invention, any two adjacent electrodes such as 630 and 640 will preferably be of opposite polarity. Thus, for example, if electrodes 630 and 700 are coupled to a positive voltage source (at a certain time) the adjacent electrodes 640 will typically be at ground or another voltage.

Figure 10B:
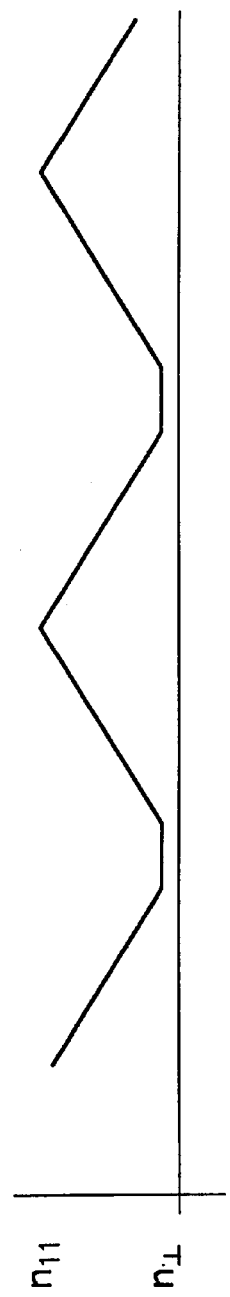
FIG. 10b illustrates a representative virtual grating structure formed according to the embodiment illustrated in FIG. 10a relative to incident illumination.

FIG. 10b illustrates a representative virtual grating structure formed according to the embodiment illustrated in FIG. 10a relative to incident illumination.

D. Completed Cell

Figure 11:
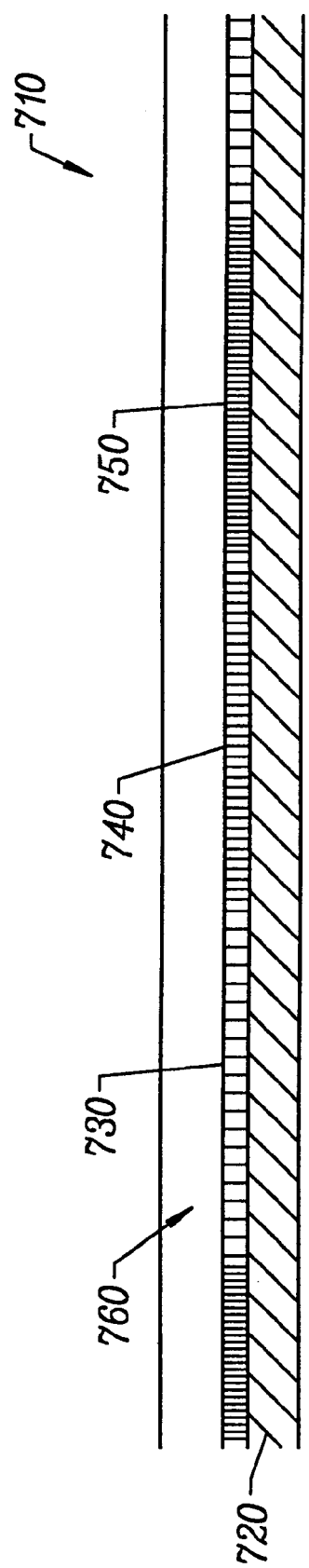
FIG. 11 illustrates a cross-section of a cell structure used in a refractive embodiment of the present invention.

FIG. 11 illustrates a cross-section of a cell structure used in a refractive embodiment of the present invention. FIG. 11 includes structure 710 including a substrate 720, virtual blaze gratings regions 730, 740, and 750, and insulating sidewall spacers 760.

In the preferred embodiment of the present invention, virtual blaze gratings 730, 740, and 750 may be embodied by any of the above configurations illustrated in FIGS. 3a–10b. In FIG. 11, for sake of convenience, virtual blaze gratings include insulating sidewall spacers 760. As was discussed above, by varying the spacing between insulating sidewall spacers 760 the color of light is produced is selectable.

Typical dimensions of each virtual blaze grating 730, 740, and 750 are approximately 3.6 microns wide and approximately 1.0 microns deep (into the page, for a rectangular structure). With the enhanced efficiency diffraction of the completed cells, approximately 25% fewer electrodes are required for red light, and approximately 12% fewer electrodes for green light, relative to the full complement required for blue light (the highest spatial frequency grating).

Figure 12:
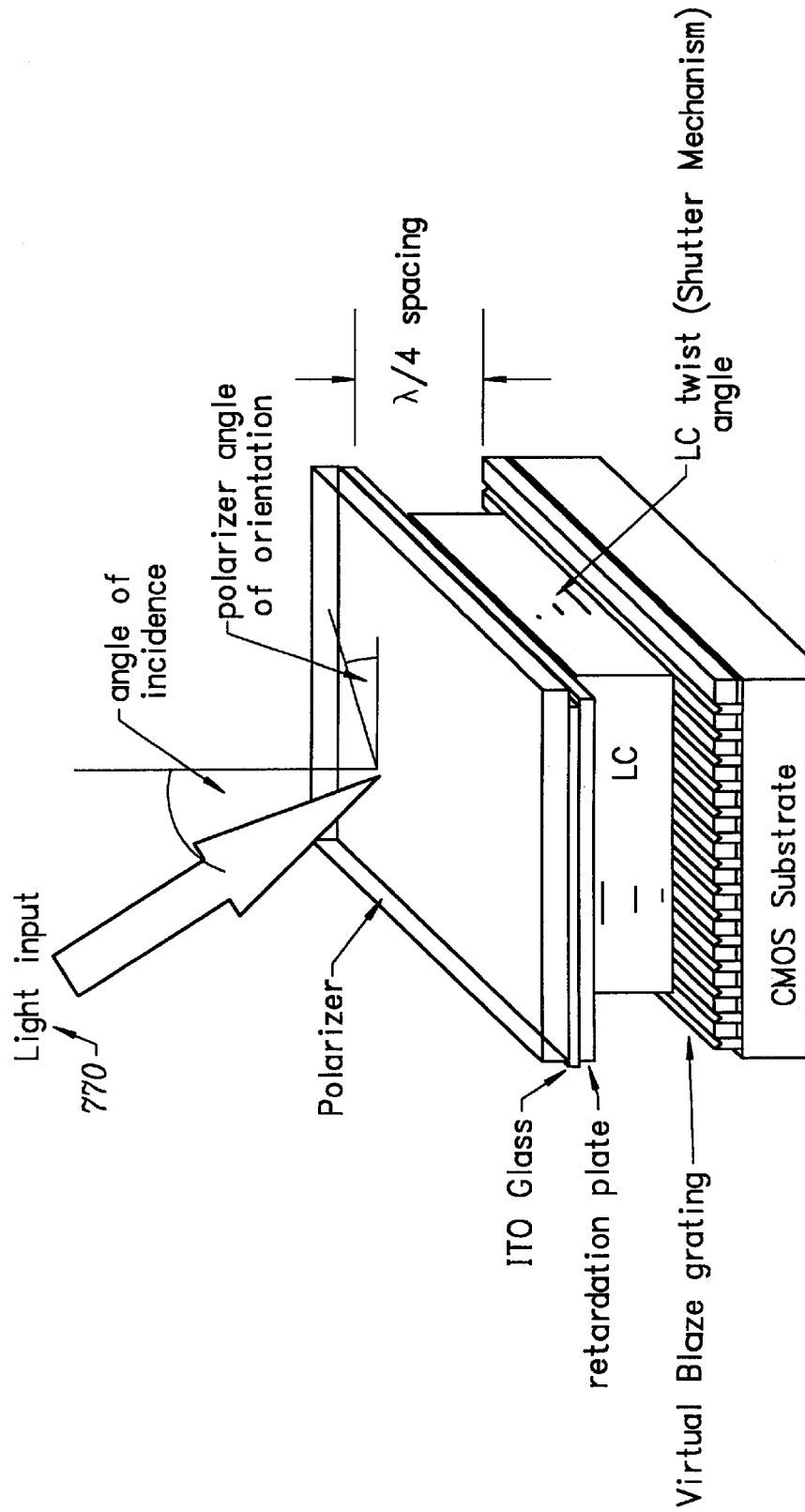
FIG. 12 illustrates a shutter mechanism.

Other structures can be disposed in combination with structure 710 such as a mask layer to enhance the color of light produced by respective virtual blaze gratings. Another structure is a shutter mechanism, as illustrated in FIG. 12. One example of a shutter mechanism is an LCD layer (twisted nematic device, ferroelectric Liquid-Crystal, etc.) in combination with a polarizing layer, for inhibiting incident light 770 from reaching the virtual blaze gratings. Another structure is a Bragg type grating, as is well known in the industry, for enhancing the viewing angle of the light produced.

CONCLUSION

In the foregoing specification, the invention has been described with reference to specific exemplary embodiments thereof. Many changes or modifications are readily envisioned. For example, it is envisioned that the invention may be combined with different optical processing layers, such as optical shutters, described above, polarizers, plasma discharge layers, Bragg gratings, and the like.

The presently claimed inventions may also be applied to many areas of technology such as displays for computer systems, displays for heads-up systems, displays for virtual reality systems, displays for projection television including high-definition television, optical computers, transmission of data via optical links such as fiber optics, optical recording devices, three dimensional displays, and any other system requiring redirection of physical energy.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. An apparatus for redirecting electromagnetic energy comprising:

a body having a plurality of cell regions, one cell region of the plurality of cell regions being defined by a top wall, a bottom wall, and two side walls, the one cell region associated with a pair of electrodes, one electrode disposed on the top wall, and one electrode disposed on the bottom wall, the one cell region having disposed therein a material in electrical communication with the pair of electrodes, with the material having an index of refraction associated therewith which varies in response to an electric field, the one electrode disposed on the top wall extending between the side walls, and the one electrode disposed on the bottom wall approximately centered between the side walls but not extending to the side walls; and a voltage source in electrical communication with the two electrodes.

2. The apparatus of claim 1 further comprising:

another cell region of the plurality of cell regions being defined by a top wall, a bottom wall, and two side walls, the another cell region associated with a pair of electrodes, one electrode disposed on the top wall, and one electrode disposed on the bottom wall, the another cell region having disposed therein the material in electrical communication with the pair of electrodes, the one electrode disposed on the top wall extending between the side walls, and the one electrode disposed on the bottom wall approximately centered between the side walls but not extending between the side walls;

wherein the one electrode disposed on the top wall of the other cell region is coupled to the one electrode disposed on the top wall of the one cell region.

3. The apparatus of claim 2 wherein the one cell region and the other cell region are separated by an electrically insulative region.

4. The apparatus of claim 3 wherein the electrically insulative region is formed from materials having an index of refraction with respect to the electromagnetic radiation, selected from a group of indices of refraction consisting essentially of an ordinary index of refraction and an extraordinary index of refraction.

5. The apparatus of claim 1 wherein the voltage source produces an electric field gradient in the one cell that extends from a maximum to a minimum electric potential, with the side walls being defined by a presence of the minimum potential.

6. The apparatus of claim 1 wherein the body includes an insulating layer lying in a plane that extends transversely to a first direction, with the one electrode disposed on the bottom wall being disposed within the insulating layer.

7. The apparatus of claim 4 wherein the side walls of the one cell region extend in the first direction.

8. The apparatus of claim 7 wherein the pair of electrodes are centered about a common axis extending along the first direction.

9. The apparatus of claim 1 wherein a width of the one electrode disposed on the top wall is greater than a width of the one electrode disposed on the bottom wall.

10. The apparatus of claim 1 wherein the top wall comprises a substrate.

11. The apparatus of claim 10 wherein the substrate includes a glass layer.

12. The apparatus of claim 1 wherein the voltage source includes a ground potential, the one electrode disposed on the top wall is coupled to the ground potential.

13. The apparatus of claim 12 wherein the voltage source includes a potential, the one electrode disposed on the bottom wall coupled to the potential.

14. The apparatus of claim 1 wherein the index of refraction varies between an ordinary index of refraction and an extraordinary index of refraction.

15. The apparatus of claim 1 wherein the one electrode disposed on the upper wall is substantially transparent with respect to the electromagnetic radiation.

16. The apparatus of claim 1 wherein the one electrode disposed on the upper wall comprises Indium Tin Oxide.

17. The apparatus of claim 1 wherein the material is formed from molecules from a group consisting essentially of PLZT, ADP, KDP and LiNBO3.

18. An apparatus for redirecting electromagnetic energy comprising:

a body having a plurality of cell regions, one cell region of the plurality of cell regions being uniquely associated with a pair of electrodes, the pair of electrodes being vertically separated, and the one cell region having terminus regions laterally separated, the plurality of cell regions including material, in electrical communication with the pair of electrodes, having an index of refraction associated therewith which varies in response to an electric field, one electrode of the pair of electrodes being relatively centered between the terminus regions but not contacting the terminus regions; and a voltage source in electrical communication with the pair of electrodes to produce an electric field gradient in the one cell region that extends from a maximum to a minimum electric potential;

wherein an electric field at the terminus regions comprises the minimum potential.

19. The apparatus of claim 18 wherein the subset includes another cell region of the plurality of cell regions being uniquely associated with another pair of electrodes, the another pair of electrode being vertically separated, and the another cell region having terminus regions laterally separated, the another cell regions including the material, one electrode of the pair of electrodes being relatively centered between the terminus regions but not contacting the terminus regions;

wherein the one cell region and the other cell region are separated by an electrically insulative region.

20. The apparatus of claim 19 wherein the electrically insulative region is formed from materials having an index of refraction, with respect to the electromagnetic energy, selected from a group of indices of refraction consisting essentially of an ordinary index of refraction and an extraordinary index of refraction.

21. The apparatus of claim 18 wherein the body includes an insulating layer lying in a plane that extends laterally, with one of the pair of electrodes being disposed within the insulating layer.

22. The apparatus of claim 18 wherein the one electrode of the pair of electrodes being relatively centered between the terminus regions has a width less than a width of the second electrode of the pair of electrodes.

23. The apparatus of claim 22 wherein the pair of electrodes are centered about a common axis extending along the first direction.

24. The apparatus of claim 18 wherein the terminus regions of the one cell region is laterally spaced-apart defining a spacing wherein the electromagnetic energy is diffracted when passing through the apparatus to produce a wavelength of radiation, with the wavelength being a function of the spacing.

25. The apparatus of claim 18 wherein the index of refraction varies between an ordinary index of refraction and an extraordinary index of refraction.

26. The apparatus of claim 18 wherein one of the pair of electrodes is relatively transparent with respect to the electromagnetic energy.

27. The apparatus of claim 18 wherein one electrode of the pair of electrodes includes Indium Tin Oxide.

28. The apparatus of claim 18 wherein the material is formed from molecules from a group consisting essentially of PLZT, ADP, KDP and LiNBO3.

29. An apparatus for redirecting electromagnetic radiation comprising:

a body having a plurality of cell regions, one of the cell regions of the plurality of cell regions associated with a pair of electrodes and having laterally separated terminus regions extending along a first direction, with the pair of electrodes being vertically separated along a second direction, the one cell region including a material in electrical communication with the pair of electrodes, the material having an index of refraction associated therewith which varies in response to an electric field, with one electrode of the pair electrodes laterally separated from and approximately centered within the terminus regions; and a voltage source in electrical communication with the two electrodes to produce an electric field gradient in the one cell region that extends from a maximum to a minimum electric potential, with the maximum at one electrode of the pair of electrodes, and the minimum at the other electrode of the pair of electrodes, and at the terminus regions.

30. The apparatus of claim 29 wherein the terminus regions of the cell region is laterally separated along the first direction by a width.

31. The apparatus of claim 30 wherein the electromagnetic radiation being diffracted when passing through the apparatus to produce a wavelength of radiation, with the wavelength being a function of the width.

32. The apparatus of claim 31 wherein a second electrode of the pair of electrodes has a width greater than a width of the one electrode of the pair of electrodes.

33. The apparatus of claim 32 wherein the pair of electrodes are centered about a common axis extending along the first direction.

34. The apparatus of claim 33 wherein the index of refraction varies between an ordinary index of refraction and an extraordinary index of refraction.

35. The apparatus of claim 34 wherein the material is formed from molecules from a group consisting essentially of PLZT, ADP, KDP and LiNBO3 and one of the pair of electrodes is transparent with respect to the electromagnetic radiation.

* * * * *

UNITED STATES PATENT AND TRADEMARK OFFICE
CERTIFICATE OF CORRECTION

PATENT NO. : 6,172,792 B1  Page 1 of 1
DATED : January 9, 2001
INVENTOR(S) : Jepsen et al.

It is certified that error appears in the above-identified patent and that said Letters Patent is hereby corrected as shown below:

<u>Column 13,</u>
Line 30, delete "4" and insert -- 6 --.

Signed and Sealed this

Thirteenth Day of November, 2001

Attest:

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,172,792 B1
DATED : January 9, 2001
INVENTOR(S) : Jepsen et al.

It is certified that error appears in the above-identified patent and that said Letters Patent is hereby corrected as shown below:

Column 13,
Line 30, delete "4" and insert -- 6 --.

Signed and Sealed this

Twenty-sixth Day of October, 2004

JON W. DUDAS
*Director of the United States Patent and Trademark Office*